United States Patent
Marinier et al.

(10) Patent No.: US 7,440,418 B2
(45) Date of Patent: Oct. 21, 2008

(54) ACCELERATING DISCOVERY OF ACCESS POINTS IN A WIRELESS LOCAL AREA NETWORK

(75) Inventors: Paul Marinier, Brossard (CA); Angelo Cuffaro, Laval (CA); Christopher Cave, Candiac (CA); Vincent Roy, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 11/018,184

(22) Filed: Dec. 21, 2004

(65) Prior Publication Data

US 2006/0056367 A1    Mar. 16, 2006

Related U.S. Application Data

(60) Provisional application No. 60/608,766, filed on Sep. 10, 2004.

(51) Int. Cl.
*H04L 12/28* (2006.01)
*H04Q 7/24* (2006.01)

(52) U.S. Cl. .................................. 370/254; 370/338

(58) Field of Classification Search ................ 370/254, 370/328, 338
See application file for complete search history.

(56) References Cited

U.S. PATENT DOCUMENTS

| | | | | |
|---|---|---|---|---|
| 5,509,027 | A * | 4/1996 | Vook et al. .................. | 375/134 |
| 2003/0087646 | A1* | 5/2003 | Funato et al. ............... | 455/456 |
| 2004/0053601 | A1* | 3/2004 | Frank et al. ................. | 455/411 |
| 2004/0264475 | A1* | 12/2004 | Kowalski .................. | 370/395.5 |
| 2005/0226207 | A1* | 10/2005 | Sharma ...................... | 370/350 |

FOREIGN PATENT DOCUMENTS

| | | |
|---|---|---|
| JP | 16-088592 | 3/2004 |
| JP | 2004-88592 | 3/2004 |
| KR | 2002-23918 | 3/2002 |

OTHER PUBLICATIONS

"IEEE Wireless LAN Edition—A compilation based on IEEE Std 802.11™—1999 (R2003) and its amendments." Sep. 19, 2003.

"IEEE Standard for Information Technology—Telecommunications and information exchange between systems—Local and metropolitan area networks—Specific requirements. Part 11: Wireless LAN Medium Access Control (MAC) and Physical Layer (PHY) specifications. Amendment 5: Spectrum and Transmit Power Management Extensions in the 5 GHz band in Europe." Oct. 14, 2003. IEEE Std 802.11H™-2003.

(Continued)

*Primary Examiner*—Kevin C Harper
(74) *Attorney, Agent, or Firm*—Volpe and Koenig, P.C.

(57) ABSTRACT

A method for accelerating discovery of access points (APs) in a wireless local area network begins by transmitting an advertisement packet by an AP via at least one channel other than a channel on which the AP transmits beacon signals. The advertisement packet is received by a station (STA), which then determines whether to associate to the transmitting AP. The advertisement packet can include reassociation information, such that the STA can associate to the AP based on the information in the advertisement packet, or timing information, such that the STA can tune to the AP and receive the AP's beacon without dwelling on the AP for an extended period of time.

8 Claims, 2 Drawing Sheets

OTHER PUBLICATIONS

"IEEE Information technology—Telecommunications and information exchange between systems—Local and metropolitan area networks—Specific requirements—Part 11: Wireless LAN Medium Access Control (MAC) and Physical Layer (PHY) Specifications." Jun. 12, 2003. ANSI/IEEE Std 802.11, 1999 Edition (R2003).

Information Technology—Telecommunications and Information Exchange Between Systems—Local and Metropolitan Area Networks—Specific Requirements. Part 11: Wireless LAN Medium Access Control (MAC) and Physical Layer (PHY) Specifications, Std. 802.11, 1999 Edition.

* cited by examiner

ACCELERATING DISCOVERY OF ACCESS POINTS IN A WIRELESS LOCAL AREA NETWORK

CROSS REFERENCE TO RELATED APPLICATION

This application claims the benefit of U.S. Provisional Application No. 60/608,766, filed Sep. 10, 2004, which is incorporated by reference as if fully set forth herein.

FIELD OF INVENTION

The present invention generally relates to wireless local area networks (WLANs), and more particularly, to a method for accelerating discovery of access points (APs) by a station (STA) in passive scanning mode.

BACKGROUND

In an AP-based wireless local area network, a STA communicates with a specific AP situated in the vicinity of the STA; the STA is said to be associated to this AP. It is sometimes necessary or desirable for a STA to change the AP to which it is associated. For example, the STA may be moving out of the area covered by the AP to which it is originally associated (i.e., roaming) and experiencing poor signal conditions. Another situation is when throughput becomes poor due to congestion arising in the basic service set (BSS) served by the original AP.

In order for a STA to reassociate to a new AP, it must first discover the APs in its vicinity that are potentially available. One method for performing this search is the passive scanning mode. In passive scanning, the STA listens for beacon packets sent by neighboring APs, which are typically sent approximately every 100 ms. The STA listens on each transmission channel, and changes channels at a set interval. Once the STA has listened to a beacon and decoded the information contained in the beacon, it may initiate a procedure for reassociating to the neighboring AP.

The passive scanning mode suffers from a drawback, because the neighboring APs may be operating on different channels. Thus, to listen to the beacon, the STA has to tune to a different channel than the one it is currently operating on with its associated AP. Since the STA generally does not know about the timing of beacon transmissions from other APs, it may need to dwell on each channel for a relatively long time (>100 ms) to ensure that it has received the beacons from all neighboring APs. While it is listening on other channels, the STA cannot receive packets from its associated AP and its communications are thus disrupted. Such disruption may adversely and significantly impact the quality of service perceived by the user.

SUMMARY

A method for accelerating discovery of access points (APs) in a wireless local area network begins by transmitting an advertisement packet by an AP via at least one channel other than a channel on which the AP transmits beacon signals. The advertisement packet is received by a station (STA), which then determines whether to associate to the transmitting AP. The advertisement packet can include reassociation information, such that the STA can associate to the AP based on the information in the advertisement packet, or timing information, such that the STA can tune to the AP and receive the AP's beacon without dwelling on the AP for an extended period of time.

In a wireless local area network including an AP having a transmitter and a receiver and at least one STA having a receiver and a transmitter, a system for accelerating discovery of APs includes an advertisement packet and determining means at each STA. The advertisement packet is transmitted by an AP on at least one channel other than a channel on which the AP transmits beacon signals and is received by at least one STA. The determining means is used to determine whether to associate a STA to the transmitting AP based on the received advertisement packet.

BRIEF DESCRIPTION OF THE DRAWINGS

A more detailed understanding of the invention may be had from the following description of a preferred embodiment, given by way of example, and to be understood in conjunction with the accompanying drawings, wherein.

DETAILED DESCRIPTION OF THE PREFERRED EMBODIMENTS

Hereafter, the term "station" (STA) includes, but is not limited to, a wireless transmit/receive unit, a user equipment, a fixed or mobile subscriber unit, a pager, or any other type of device capable of operating in a wireless environment. When referred to hereafter, the term "access point" (AP) includes, but is not limited to, a base station, a Node B, a site controller, or any other type of interfacing device in a wireless environment.

The present invention solves the problem described above in the following manner. An AP may, under certain conditions, transmit additional packets (called "advertisement packets") on one or more frequency channel(s) different from the one it is currently operating on. This functionality allows STAs operating on these different channels to learn about the existence of the AP without having to tune their receivers to other channels, thereby avoiding communication disruption.

Figure 1:
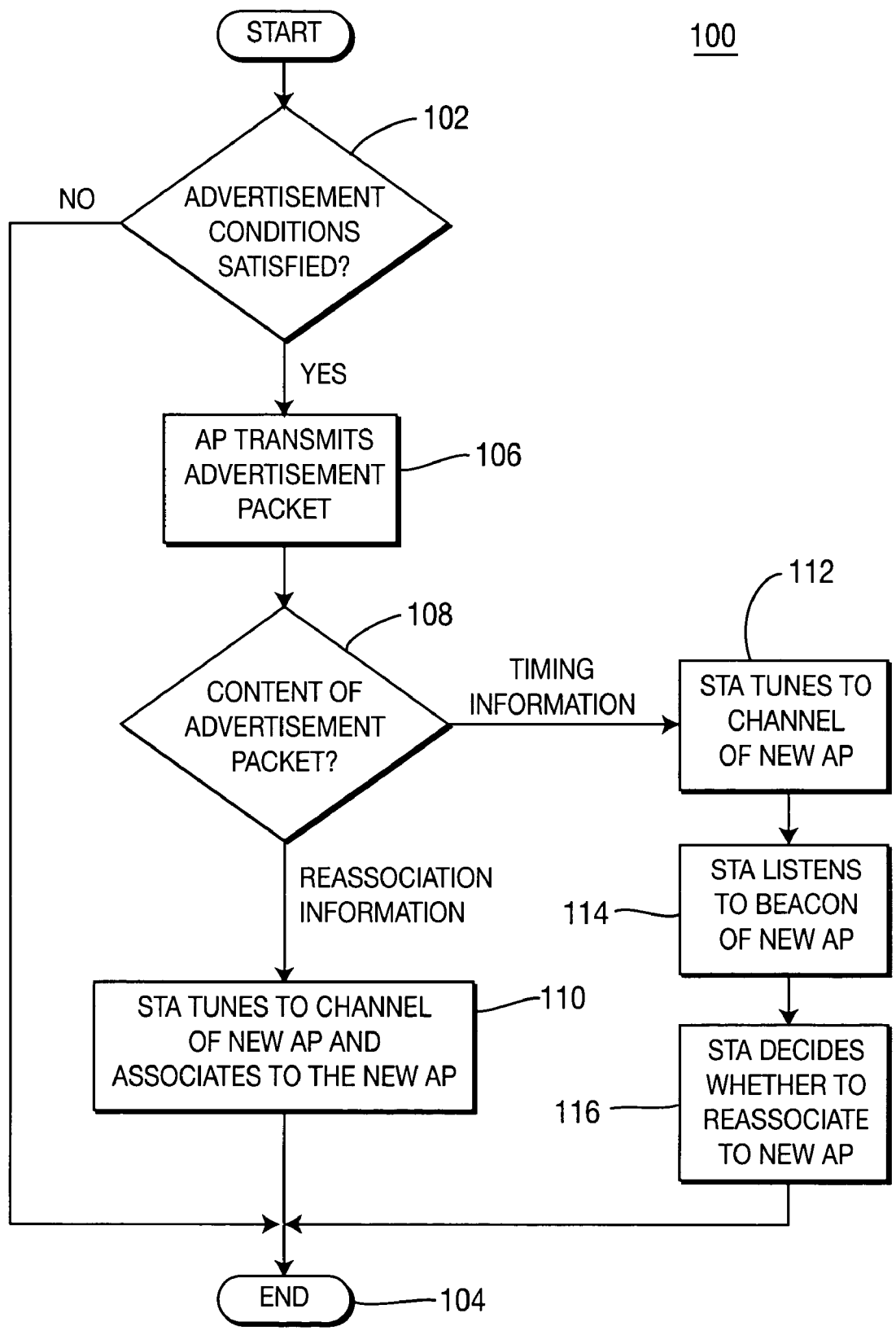
FIG. 1 is a flowchart of a method for AP discovery in accordance with the present invention.

A method 100 for discovering APs in a WLAN in accordance with the present invention is shown in FIG. 1. The method 100 begins by determining whether the AP has met a predetermined condition for transmitting an advertisement packet (step 102). An AP may decide to advertise itself on other channels only if certain conditions are satisfied. These conditions include, for example:

1) Sufficiently low load conditions in the BSS served by the AP, so that the AP can tune to the other frequency channels to transmit its advertisement packets without excessive disruption. There is no need for an AP to advertise itself if it cannot accommodate new STAs. The AP can avoid having its associated STAs transmit information to it during the time it is transmitting the advertisement packet by, for example, sending Request to Send (RTS) or Clear to Send packets (CTS) to itself or calling a contention-free period.

2) Indications received from neighboring AP(s) (via inter-AP signaling) that congestion exists in their BSSs and that there is a need to off-load traffic to another channel.

3) The AP could discover by itself that congestion exists in the other channels by periodically tuning to the other channels for short periods of time and listening to the traffic on each channel.

4.) The AP "knows" if there are STAs in the extended service set (ESS) that require fast roaming (for example, if the STAs use delay-sensitive applications such as voice). The AP could learn this information via inter-AP signaling. If there are several delay-sensitive STAs, this would encourage the AP to send advertisement packets.

It should be understood by those of skill in the art that the above conditions are merely exemplary, and that one skilled in the art can envision other conditions that an AP would need to meet prior to sending an advertisement packet.

If the AP does not meet one of the conditions for transmitting an advertisement packet, the method 100 terminates (step 104). If the AP meets one of the conditions for transmitting an advertisement packet, then the AP transmits an advertisement packet (step 106). An advertisement packet contains the following information:

1) The frequency channel where the AP can be found; and
2) Either:
  a) All the information required for the STA to initiate a reassociation procedure to the AP (e.g., address of the AP, AP capabilities, etc.), a part of the information contained in the beacon, or the entire beacon; or
  b) The timing information for the transmission of the beacon packet by the AP on its operating channel, with respect to the time of transmission of the advertisement packet.

The STA receives the advertisement packet and determines the contents of the advertisement packet (step 108). If the packet contains reassociation information, then if the STA desires to reassociate, it can tune to the channel where the AP is operating and immediately initiate an association procedure to the new AP (step 110). The method 100 then terminates (step 104).

If the packet contains timing information (step 108), then if the STA desires to reassociate, it can tune to the channel where the AP is operating just before the beacon transmission time by this AP (step 112) and listen to the beacon, thus avoiding a long dwell time on the new channel (step 114). The STA then separately decides whether to reassociate to the new AP (step 116) and the method terminates (step 104).

Figure 2:
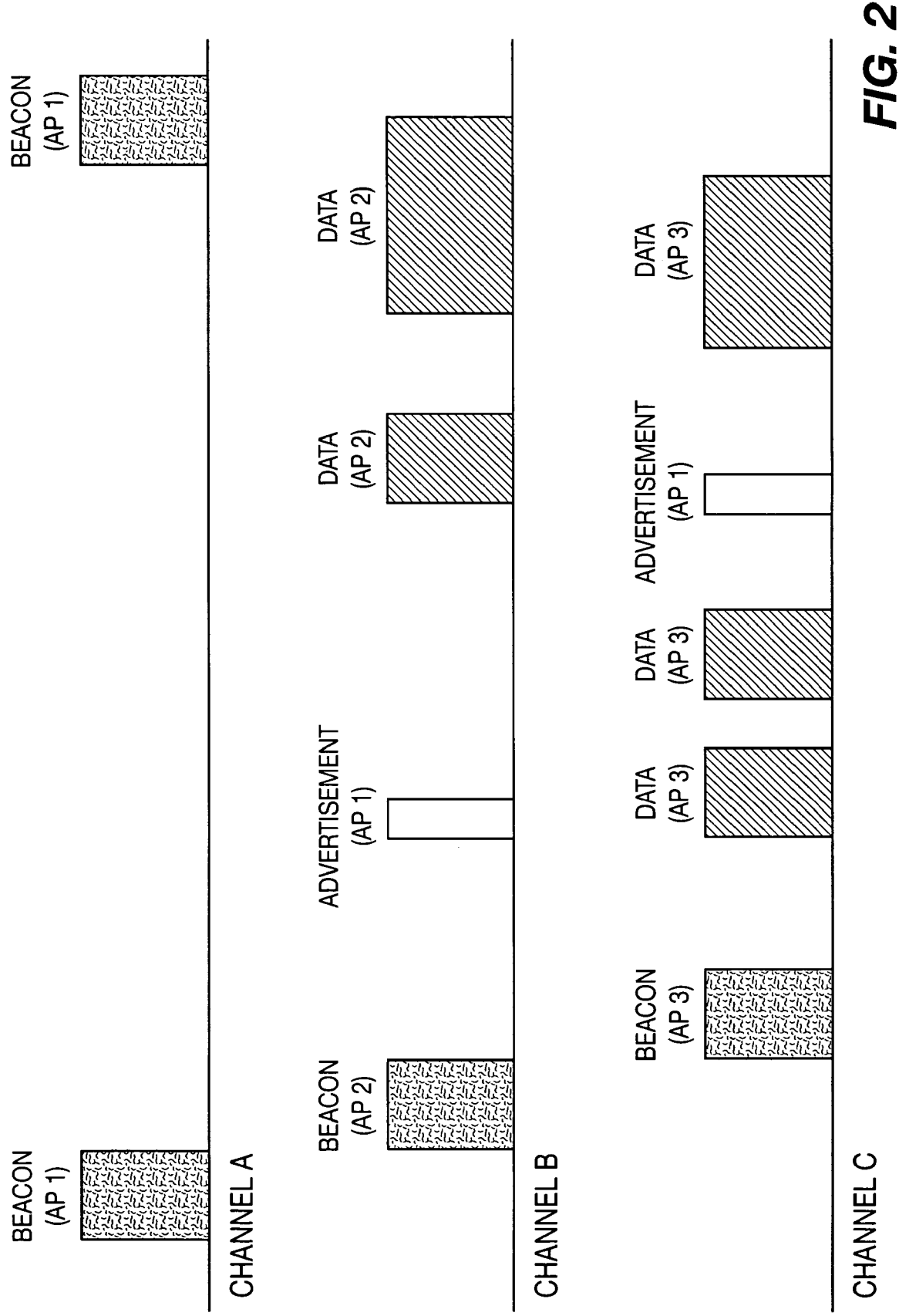
FIG. 2 is a diagram showing transmission of advertisement packets according to the method shown in FIG. 1.

FIG. 2 shows an example of packet transmissions with three APs (AP1, AP2, and AP3) operating on three channels (A, B, and C), respectively. In this example, AP1 (which is under-loaded) transmits advertisement packets on channels B and C.

An AP should typically transmit no more than one advertisement packet for each channel per beacon period. Within this period, the timing of transmission of the advertisement packet may be selected randomly. Alternatively, the AP may target a certain time offset with respect to the transmission of its own beacon. Prior to the transmission of the advertisement packet on any other channel, the AP should obey the normal medium access rules like any other STA would (i.e., waiting for a certain amount of time after the medium becomes idle on the selected channel before transmitting).

The method 100 of the present invention provides following advantages.

1) Reducing the time STAs utilizing the passive scanning mode spend listening to other frequency channels. The method 100 also reduces the disruption for STAs utilizing the active scanning mode, since there is no need to send probe requests on the other channels.

2) Compared to an alternative approach where APs transmit beacon timing information of neighboring APs, the method 100 does not require synchronization between APs. In addition, a STA listening to an advertisement packet from a neighboring AP is also assured of being capable of hearing that AP's beacon. In the alternative approach, the STA could be far away from the neighboring AP whose beacon timing information is provided by the serving AP. The STA can also readily assess, based on the signal strength of the advertisement packet, if the neighboring AP would be suitable for transmitting data at a rate equal to or higher than its serving AP.

3) The method 100 can be used as an effective mechanism for load balancing between APs. The STAs do not have to make a roaming decision before discovering the other APs that are available and accessible to them on other channels, so the STAs could more readily reassociate and balance the load more efficiently. In case a centralized architecture is adopted, the access controller can manage which APs will send advertisement packets based on load information.

Although the features and elements of the present invention are described in the preferred embodiments in particular combinations, each feature or element can be used alone (without the other features and elements of the preferred embodiments) or in various combinations with or without other features and elements of the present invention. While specific embodiments of the present invention have been shown and described, many modifications and variations could be made by one skilled in the art without departing from the scope of the invention. The above description serves to illustrate and not limit the particular invention in any way.

What is claimed is:

1. A method for accelerating discovery of access points (APs), comprising:
  determining whether a predetermined condition for transmitting an advertisement packet has been met, wherein the predetermined condition includes a determination of whether there is a low load condition in the basic service set served by the AP; and
  transmitting the advertisement packet by the AP via at least one channel if the predetermined condition has been met, wherein the AP does not transmit beacon signals on the at least one channel.

2. A method for accelerating discovery of access points (APs), comprising:
  determining whether a predetermined condition for transmitting an advertisement packet has been met, wherein the predetermined condition includes an indication received from a neighboring AP that congestion exists in the neighboring AP's basic service set; and
  transmitting the advertisement packet by the AP via at least one channel if the predetermined condition has been met, wherein the AP does not transmit beacon signals on the at least one channel.

3. A method for accelerating discovery of access points (APs), comprising:
  determining whether a predetermined condition for transmitting an advertisement packet has been met, wherein the predetermined condition includes a determination that congestion exists on channels other than a currently used channel, the congestion being determined by the AP by periodically tuning to the other channels and listening to the traffic on the other channels; and
  transmitting the advertisement packet by the AP via at least one channel if the predetermined condition has been met, wherein the AP does not transmit beacon signals on the at least one channel.

4. A method for accelerating discovery of access points (APs), comprising:
  determining whether a predetermined condition for transmitting an advertisement packet has been met, wherein the predetermined condition includes a determination of whether there are delay-sensitive stations in an extended service set; and transmitting the advertisement packet by the AP via at least one channel if the predetermined condition has been met, wherein the AP does not transmit beacon signals on the at least one channel.

5. An access point (AP), comprising:

a transmitter configured to transmit an advertisement packet on at least one channel, wherein the AP does not transmit beacon signals on the at least one channel; and a processor configured to determine whether a predetermined condition has been met prior to transmitting the advertisement packet, wherein the predetermined condition includes a determination of whether there ia a low load condition in a basic service set served by the AP.

6. An access point (AP), comprising:

a transmitter configured to transmit an advertisement packet on at least one channel, wheren the AP does not transmit beacon signals on the at least one channel;

a receiver; and a processor configured to determine whether a predetermined condition has been met prior to transmitting the advertisement packet, wherein the predetermined condition includes an indication received from a neighboring AP that congestion exists in the neighboring AP's basic service set.

7. An access point (AP), comprising:

a transmitter configured to transmit an advertisement packet on at least one channel, wherein an AP does not transmit beacon signals on the at least one chanenl;

a receiver; and a processor configured to determine whether a predetermined condition has been met prior to transmitting the advertisement packet, wherein the predetermined condition includes a determination that congestion exists on channels other than a currently used channel, the congestion being determined by the AP by periodically tuning to the other channels and listening to the traffic on the other channels.

8. An access point (AP), comprising:

a transmitter configured to transmit an advertisement packet transmitted on at least one channel, wherein the AP does not transmit beacon signals on the at least one channel;

a receiver; and a processor configured to determine whether a predetermined condition has been met prior to transmitting the advertisement packet, wherein the predetermined condition includes a determination of whether there are delay-sensitive stations in an extended service set.

* * * * *

UNITED STATES PATENT AND TRADEMARK OFFICE
CERTIFICATE OF CORRECTION

| | | |
|---|---|---|
| PATENT NO. | : 7,440,418 B2 | Page 1 of 1 |
| APPLICATION NO. | : 11/018184 | |
| DATED | : October 21, 2008 | |
| INVENTOR(S) | : Marinier et al. | |

It is certified that error appears in the above-identified patent and that said Letters Patent is hereby corrected as shown below:

IN THE CLAIMS

At claim 1, column 4, line 30, after the words "condition in" delete "the" and insert therefor --a--.

Signed and Sealed this

Thirty-first Day of March, 2009

JOHN DOLL
*Acting Director of the United States Patent and Trademark Office*